Aug. 4, 1942.  A. D. GARRISON  2,291,958
PROCESS OF PREPARING PHOSPHORUS AND BORON CONTAINING
COMPOUNDS AND PRODUCTS OBTAINED THEREBY
Filed July 7, 1937
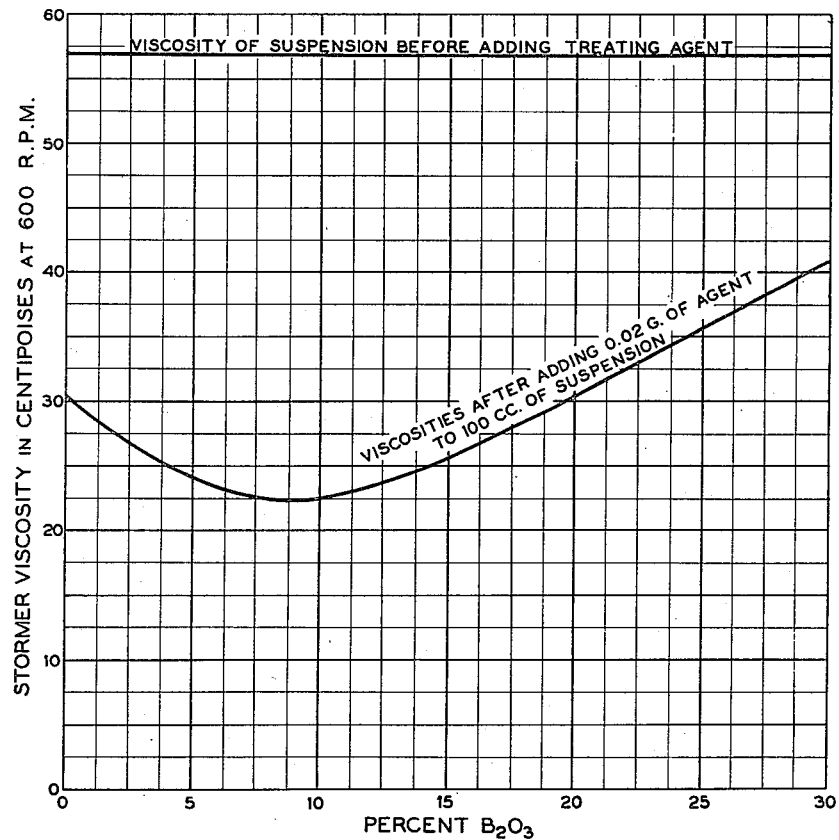
COMPARATIVE VISCOSITY-REDUCING EFFECTS OF GLASSES PREPARED BY FLUXING $NaH_2PO_4$ AND BORAX AND SHOCK-CHILLING
ALLEN D. GARRISON
INVENTOR Patented Aug. 4, 1942

2,291,958

UNITED STATES PATENT OFFICE 2,291,958

PROCESS OF PREPARING PHOSPHORUS AND BORON CONTAINING COMPOUNDS AND PRODUCTS OBTAINED THEREBY

Allen D. Garrison, Houston, Tex., assignor, by mesne assignments, to The Texas Company, New York, N. Y., a corporation of Delaware Application July 7, 1937, Serial No. 152,464

13 Claims. (Cl. 252—351)

This invention relates to anhydrous compositions of the alkali metals with boron, phosphorus and oxygen in varying proportions, and the method of preparing the same. More specifically, this invention relates to the preparation of these compositions in the form of water-soluble glasses prepared by fusing together oxygen-containing compounds of alkali metals, of boron, and of phosphorus at elevated temperatures whereby combination thereof is effected, and then quickly chilling the clear fused mass. In the practice of the invention I contemplate the use not only of the oxygen-containing compounds of the alkali metals, of boron, and of phosphorus, but also the use of oxygen derivative compounds containing two or more of the specified elements, as is hereinafter set forth.

Anhydrous alkali metal compositions of boron, phosphorus and oxygen are not unknown, since the preparation of various melts of the same are described in the literature. For example, in "A Comprehensive Treatise on Inorganic and Theoretical Chemistry" by Mellor, vol. V, page 79, there is disclosed the preparation of melts of potassium metaphosphate with potassium metaborate, and sodium metaphosphate with sodium metaborate. However, these melts were made as part of a theoretical study of the freezing points of these mixtures, which study customarily and of necessity is conducted with a very slow rate of cooling in order to observe and record the desired information. In many instances the fused mass solidified with crystallization while with other proportions of the ingredients vitreous masses were formed. The compositions which I have discovered differ from the substances of the foregoing disclosure both in chemical and physical properties, notwithstanding the fact that some of my compositions may contain similar proportions of the chemical elements. All of the compositions discovered by me are free from any apparent crystalline structure; as prepared by me they are glassy solids giving vitreous fractures.

In direct contrast with the solids obtained according to the disclosures of the prior art, the compositions I have discovered are produced by shock-chilling the clear melts, thereby preventing the formation of crystalline bodies and resulting in the preservation of the chilled melt in the form of a supercooled liquid. Their peculiar physical and chemical properties are directly resultant from the shock-chilling. Not only are all of my compositions transparent glassy solids, but they completely dissolve in water, and, when finely divided, dissolve with moderate speed. They are highly soluble in water and, when dissolved to the extent of about 15% or more by weight, yield syrupy solutions. The chemical reactions as well as the physical behavior of the compositions indicate that they are not crystalloidal but partake of the properties of colloidal compounds. For example, water solutions of the compositions, when treated with dilute solutions of certain metal salts such as silver, copper, calcium, strontium, barium, iron, etc., yield hydrous colloidal dispersions of metal complexes similar to hydrous oxides and silicates of these metals, as distinguished from the more crystalline precipitates, such, for example, as calcium carbonate or barium sulfate.

Moreover, the compositions of my invention are especially characterized by a slower rate of rehydration in water solution than sodium hexametaphosphate which, as well known, has a strong tendency toward rapid rehydration, especially at elevated temperatures. In fact, it has been found that some of my compositions rehydrate at rates as little at ½ to ⅓ the rate of rehydration of sodium hexametaphosphate.

Also it has been found that the compositions in the series forming the basis of this invention, and containing 5% or more of boric oxide, display substantially no calcium- or magnesium-sequestering action in water solution, thus differing from sodium hexametaphosphate, which has marked sequestering action. Even with those compositions containing less than 5% of boric oxide, the calcium- and magnesium-sequestering action is substantially less than that of sodium hexametaphosphate.

I have observed that upon treating dilute water solutions of my compositions containing from 5 to 55% of boria with water solutions of a copper salt such as copper sulfate, voluminous flocks are formed. These remain in colloidal suspension in dilute solutions, but in more concentrated solutions they slowly precipitate. On the other hand, when water solutions of the polymerized metaphosphates are reacted with an aqueous solution of a copper salt such as copper sulfate, a clear blue solution is obtained.

Soluble salts of calcium, strontium and barium react with water solutions of the compositions which I have discovered in a similar manner, yielding colloidal suspensions in dilute solutions and voluminous flocks on coagulation by larger quantities of the alkaline earth salts. On the other hand, the polymerized alkali metal metaphosphates react with the alkaline earth metal salts to form water-soluble complexes which are substantially non-ionized.

These compositions yield new and novel chemical reactions which are not characteristic of either the alkali metal borates or the polymerized alkali metal metaphosphates. The materials which I have discovered are eminently useful as deflocculating agents for certain materials in water, which property makes them valuable in a large number of the industrial arts. I have successfully deflocculated certain materials to a high degree by relatively small amounts of these new compositions dissolved in the water. I recognize that the alkali metal metaphosphates and the alkali metal borates are known to possess deflocculating characteristics. However, the compositions which I describe are superior to the alkali metal metaphosphates or the alkali borates alone for deflocculation of certain materials. I attribute the extraordinary deflocculating ability of these compositions in water to their specific effect upon the adhesion tension at the interface of the water and the solid materials undergoing deflocculation.

As an example of the deflocculating effect of my compositions, I have treated water suspensions of pulverized shale obtained during the drilling of an oil well in the Manvel Field, South Texas. The deflocculating effect was observed as a reduction in the viscosity of the suspension from that of the original suspension containing no added chemical. The viscosities were measured in centipoises by means of a Stormer viscosimeter operating at a rate of 600 R. P. M. The results were plotted as shown on the accompanying drawing. It will be observed from the drawing that the original suspension had a viscosity of 57 c. p.; on the addition of sodium hexametaphosphate to the suspension in the ratio of 0.02 gram per 100 cc. of the suspension the viscosity was reduced to 30 c. p. Samples of the suspension to which were added boria-containing compositions made according to my invention showed a marked increase in viscosity-reducing effect as compared with sodium hexametaphosphate, up to compositions containing about 20% boria. Compositions containing more than about 20% boria also exhibited marked viscosity-reducing effect although in gradually decreasing amount with the increase in boria content. Other inorganic materials, such, for example, as finely ground calcium carbonate and barium sulfate have been deflocculated to a high degree by small amounts of these compositions in water solution.

As specific illustrations of the products that may be prepared according to my invention, I give below examples of varying composition. It is to be understood that by the term "fusion" I contemplate the reagents to a temperature in the neighborhood of 800 to 900° C. or above, at which temperature the reagents quickly fuse to glasses with a rapid evolution of water until the melt is substantially anhydrous and clear. When it is observed that no more water vapor is evolved, which point may be recognized by the cessation of bubbling, the melt is subjected to rapid cooling which I term "shock-chilling." I effect this rapid cooling by pouring the melt in thin layers, preferably from 3 to 4 mm. in thickness, upon water-chilled plates or revolving cylinders whereby the melt is brought to room temperature in very short time of the order of 1 to 3 minutes. The rate of temperature reduction therefore is in excess of 200° C. per minute. I do not intend to limit myself to the above method of cooling but contemplate the use of other methods whereby rapid or shock-chilling may be attained.

Example 1

A mixture of 6 mols of sodium dihydrogen orthophosphate was fused with 1 mol of borax, yielding a clear melt which was subsequently shock-chilled. The resultant glass had a molecular ratio of oxides as follows: $4Na_2O, 3P_2O_5, 2B_2O_3$.

Example 2

7 mols of sodium dihydrogen orthophosphate were fused with 1 mol of borax, yielding a melt which was subsequently shock-chilled. The resultant glass had a molecular ratio of oxides as follows: $9Na_2O, 7P_2O_5, 4B_2O_3$.

Example 3

8 mols of sodium dihydrogen orthophosphate were fused with 1 mol of borax, yielding a melt which was subsequently shock-chilled. The resultant glass had a molecular ratio of oxides as follows: $5Na_2O, 4P_2O_5, 2B_2O_3$.

Example 4

12 mols of sodium monometaphosphate were fused with 1 mol of borax, yielding a melt which was subsequently shock-chilled. The resultant glass had a molecular ratio of oxides as follows: $7Na_2O, 6P_2O_5, 2B_2O_3$.

Example 5

24 mols of sodium monometaphosphate were fused with 1 mol of borax, yielding a melt which was subsequently shock-chilled. The resultant glass had a molecular ratio of oxides as follows: $13Na_2O, 12P_2O_5, 2B_2O_3$.

Example 6

5 mols of sodium dihydrogen orthophosphate were fused with 1 mol of borax, yielding a melt which was subsequently shock-chilled. The resultant glass had a molecular ratio of oxides as follows: $7Na_2O, 5P_2O_5, 4B_2O_3$.

Example 7

2 mols of sodium hexametaphosphate were fused with 3 mols of borax, yielding a melt which was subsequently shock-chilled. The resultant glass had a molecular ratio of oxides as follows: $3Na_2O, 2P_2O_5, 2B_2O_3$.

Example 8

4 mols of sodium dihydrogen orthophosphate were fused with 1 mol of borax, yielding a melt which was subsequently shock-chilled. The resultant glass had a molecular ratio of oxides as follows: $3Na_2O, 2P_2O_5, 2B_2O_3$.

This example, taken with Example 7, illustrates that it is possible to duplicate the compound which I have discovered by the fusion of different sodium-, phosphorus-, boron- and oxygen-containing compounds. The same composition as that described in Example 8 may be obtained by the fusion of 3 mols of sodium oxide, 2 mols of phosphorus pentoxide, and 2 mols of boric oxide.

Example 9

1 mol of sodium hexametaphosphate was fused with 2 mols of borax, yielding a melt which was subsequently shock-chilled. The resultant glass had a molecular ratio of oxides as follows: $5Na_2O, 3P_2O_5, 4B_2O_3$.

Example 10

4 mols of sodium dihydrogen orthophosphate were fused with 1 mol of borax and 1 mol of boric oxide, yielding a melt which was subsequently shock-chilled. The resultant glass had a molecular ratio of oxides as follows: $3Na_2O$, $2P_2O_5$, $3B_2O_3$.

Example 11

4 mols of sodium dihydrogen orthophosphate were fused with 1 mol of borax and 2 mols of boric oxide, yielding a melt which was subsequently shock-chilled. The resultant glass had a molecular ratio of oxides as follows: $3Na_2O$, $2P_2O_5$, $4B_2O_3$.

Example 12

1 mol of sodium hexametaphosphate was fused with 4 mols of borax, yielding a melt which was subsequently shock-chilled. The resultant glass had a molecular ratio of oxides as follows: $7Na_2O$, $3P_2O_5$, $8B_2O_3$.

Example 13

2 mols of sodium dihydrogen orthophosphate were fused with 1 mol of boric acid, yielding a melt which was subsequently shock-chilled. The resultant glass had a molecular ratio of oxides as follows: $1Na_2O$, $1P_2O_5$, $1B_2O_3$.

Example 14

2 mols of sodium dihydrogen orthophosphate were fused with 2 mols of disodium orthophosphate and 1 mol of borax, yielding a melt which was subsequently shock-chilled. The resultant glass had a molecular ratio of oxides as follows: $2Na_2O$, $1P_2O_5$, $1B_2O_3$.

1 mol of sodium metaphosphate may be fused with 1 mol of sodium metaborate to obtain a glass having the same composition.

It is to be understood that the above specific examples are given merely for the purpose of illustration of various compositions which may be made in accordance with my invention. Obviously other alkali metal phosphates than those set forth in the specific examples may be used to secure the desired products by adjusting the amount of alkali metal oxide introduced through means of the boron compounds going into the melt. I also contemplate generally the preparation of anhydrous compositions of the alkali metals with boron, phosphorus and oxygen in varying proportions in which the boric oxide content may range from about 1% to about 68%.

In using the designations of the oxides of Na, P and B in the specification and claims it is not to be understood that these oxides are present as such in the products of the melts. The use of these designations is merely for the sake of convenience in expressing the proportions of the elements present, in accordance with the common practice employed in reporting compositions of heterogeneous inorganic masses, such as glass, commercial sodium silicate, and the like.

Obviously many modifications and variations of the invention, as hereinbefore set forth, may be made without departing from the spirit and scope therefor and therefore only such limitations should be imposed as are indicated in the appended claims.

I claim:

1. A deflocculating and viscosity reducing material for solids in aqueous suspension comprising a transparent glassy non-crystalline solid which completely dissolves in water with moderate speed to the extent of about 15% and more by weight to yield syrupy solutions, and which is a shock-chilled anhydrous melt consisting essentially of alkali metal oxide, $P_2O_5$ and $B_2O_3$, the $B_2O_3$ content thereof being within the range of about 1% to 20% by weight, the material having greater deflocculating and viscosity reducing effect upon a solid aqueous suspension than an equal quantity of sodium hexametaphosphate and having a slower rate of rehydration in water solution than sodium hexametaphosphate.

2. A deflocculating and viscosity reducing material as defined in claim 1, in which the $B_2O_3$ content of the material is within the range of about 3.9% to 9.75% by weight.

3. A deflocculating and viscosity reducing material as defined in claim 1, in which the alkali metal present in the material is sodium.

4. A deflocculating and viscosity reducing material as defined in claim 1, in which the $B_2O_3$ content of the material is within the range of about 3.9% to 9.75%, and in which the alkali metal present in the material is sodium.

5. The method of preparing the deflocculating and viscosity reducing material of claim 1 which comprises heating oxygen-containing compounds of the alkali metal, P and B, in suitable proportions at elevated temperatures in excess of about 800° C. until evolution of water ceases and a clear melt is obtained, and then shock-chilling the melt so as to cool it to atmospheric temperature in a short time of the order of about one to three minutes.

6. The method of preparing the deflocculating and viscosity-reducing material of claim 1 which comprises heating a sodium phosphate and borax in suitable proportions at a temperature in excess of about 800° C. until evolution of water ceases and a clear melt is obtained, and then shock-chilling the melt so as to cool it to room temperature in a short time of the order of about one to three minutes.

7. As a new product, a non-crystalline solid which dissolves in water with moderate speed to the extent of about 15% and more by weight to yield syrupy solutions, and which is a shock-chilled anhydrous glassy melt of an alkali metal phosphate homogeneously associated with an oxygen-containing compound of boron, the $B_2O_3$ content of the product being within the range of about 1% to 20% by weight, the product having greater deflocculating and viscosity-reducing effect upon a solid aqueous suspension than an equal quantity of sodium hexametaphosphate.

8. A product in accordance with claim 7, in which the solid is a shock-chilled anhydrous glassy melt of an alkali metal hexametaphosphate homogeneously associated with an oxygen-containing compound of boron.

9. A product in accordance with claim 7, in which the solid is a shock-chilled anhydrous glassy melt of a mixture of sodium dihydrogen orthophosphate, disodium orthophosphate and an oxygen-containing compound of boron.

10. A product in accordance with claim 7, in which the alkali metal is sodium, and the $B_2O_3$ content of the product is within the range of about 3.9% to 9.75% by weight.

11. The method of preparing the product of claim 7, which comprises heating an alkali metal phosphate with an oxygen-containing compound of boron at elevated temperatures in excess of about 800° C. until evolution of water ceases and a clear melt is obtained, and then shock-chilling the melt to cool it substantially to atmospheric temperature in a short time of the order of about one to three minutes.

12. As a new product, a non-crystalline solid which dissolves in water and which is a shock-chilled anhydrous glassy melt of an alkali metal phosphate homogeneously associated with a minor but substantial amount of an oxygen-containing compound of boron.

13. As a new product, a non-crystalline solid which dissolves in water and which is a shock chilled anhydrous glassy melt of an alkali meta phosphate homogeneously associated with abou 1% to about 30% by weight of an oxygen-containing compound of boron.

ALLEN D. GARRISON.

CERTIFICATE OF CORRECTION.

Patent No. 2,291,958. August 4, 1942.

ALLEN D. GARRISON.

It is hereby certified that error appears in the printed specification of the above numbered patent requiring correction as follows: Page 2, first column, line 59, after "contemplate" insert --heating--; and that the said Letters Patent should be read with this correction therein that the same may conform to the record of the case in the Patent Office.

Signed and sealed this 1st day of September, A. D. 1942.

(Seal)

Henry Van Arsdale,
Acting Commissioner of Patents.

CERTIFICATE OF CORRECTION.

Patent No. 2,291,958.                 August 4, 1942.

ALLEN D. GARRISON.

It is hereby certified that error appears in the printed specification of the above numbered patent requiring correction as follows: Page 2, first column, line 59, after "contemplate" insert --heating--; and that the said Letters Patent should be read with this correction therein that the same may conform to the record of the case in the Patent Office.

Signed and sealed this 1st day of September, A. D. 1942.

(Seal)                              Henry Van Arsdale,
                                Acting Commissioner of Patents.